United States Patent [19]

Morningstar

[11] 3,962,202

[45] *June 8, 1976

[54] PROCESS FOR POLYMERIZING OLEFINIC MONOMERS WHICH SUBSTANTIALLY ELIMINATES POLYMER BUILDUP

[75] Inventor: Marion G. Morningstar, Avon Lake, Ohio

[73] Assignee: The B.F. Goodrich Company, Akron, Ohio

[ * ] Notice: The portion of the term of this patent subsequent to Nov. 19, 1991, has been disclaimed.

[22] Filed: Aug. 27, 1973

[21] Appl. No.: 391,879

[52] U.S. Cl. .............................. 526/74; 260/29.2 N; 526/82; 526/237; 526/343; 526/345; 526/347; 526/335; 526/280; 526/293; 526/328

[51] Int. Cl.$^2$ ...................... C08F 1/11; C08F 1/82; C08F 3/30

[58] Field of Search ................. 260/92.8 W, 94.2 R, 260/87.1, 85.7, 87.7, 87.5 C, 89.5 AW, 86.3, 93.5 W

[56] References Cited
UNITED STATES PATENTS

| | | | |
|---|---|---|---|
| 3,757,001 | 9/1973 | Reiter | 260/92.8 W |
| 3,778,423 | 12/1973 | Reiter | 260/92.8 W |

*Primary Examiner*—Christopher A. Henderson
*Attorney, Agent, or Firm*—Roy P. Wymbs

[57] ABSTRACT

There is disclosed a process for polymerizing olefinic monomers, such as vinyl halides, vinylidene halides and vinylidene monomers having at least one terminal $CH_2=C<$ grouping, and mixtures thereof whereby polymer build-up on the inner surfaces of the reactor is substantially eliminated. The process is carried out in a reation vessel the inner surfaces of which are coated with a coating composition containing, as a primary ingredient, polyethyleneimine and wherein the polymerization medium in contact with said coated surfaces contains a water-soluble divalent tin salt as a water-phase polymerization inhibitor. The coating and inhibitor produce a synergistic effect.

8 Claims, No Drawings

PROCESS FOR POLYMERIZING OLEFINIC MONOMERS WHICH SUBSTANTIALLY ELIMINATES POLYMER BUILDUP

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "build-up," of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with copolymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor, including the surfaces of the baffles and agitator. Obviously, this polymer build-up must be removed since it results in further formation of polymer build-up on the reactor surfaces which results in a crust that adversely affects heat transfer and contaminates the polymer being produced.

The nature of the polymer build-up or insoluble deposit on the walls of the reactor is such that in the commercial production of polymers, as described above, it has in the past been standard practice, after each polymerization reaction is completed, to have an operator enter the reactor and scrape the polymer build-up off the walls and off the baffles and agitator. An operation such as this is not only costly, both in labor and down-time of the reactor, but presents potential health hazards as well.

Various methods have heretofore been proposed to reduce the amount and nature of polymer build-up on polymerization reaction surfaces, such as solvent cleaning, various hydraulic and mechanical reactor cleaners, and the like. However, none of these methods has proved to be the ultimate in polymer build-up removal or prevention. That is to say, these various methods and apparatus have done an acceptable job, but there still remained room for improvement in this area, particularly from an economic point of view. As a result, a number of coating compositions have been recommended for use on the inner surfaces of the reactor to reduce build-up. One particularly good coating composition was one comprised predominantly of polyethyleneimine and described by the present applicant in copending application U.S. Ser. No. 391,880, filed on even date herewith, now U.S. Pat. No. 3,849,179. This coating essentially eliminates polymer build-up when employed in a polymerization reactor. However, Applicant did not stop there and has now developed a new process which not only substantially eliminates polymer build-up but presents a substantial improvement over prior art processes and the use of the polyethyleneimine coating per se.

SUMMARY OF THE INVENTION

It has unexpectedly been found that polymer build-up in a polymerization reactor can be substantially eliminated by conducting the polymerization reaction in a vessel, the inner surfaces of which have been previously coated with a coating composition containing, as a primary ingredient, polyethyleneimine, with or without the addition thereto of a curing agent, and wherein the polymerization medium in contact with said coating contains a water-soluble divalent tin salt as a water-phase polymerization inhibitor. The effect of both the coating and inhibitor is synergistic and the combination of the two produces far superior results in reducing polymer build-up than the use of either alone, since by use of such process, polymer build-up on the inner surfaces of the vessel are substantially eliminated. Due to the water solubility of polyethyleneimine the coating is very easily applied from an aqueous solution.

DETAILED DESCRIPTION

In accordance with the process of the present invention it is first necessary to apply the proper coating to the inner surfaces of the polymerization reaction vessel to be employed. The specific coating which functions satisfactorily with the water-soluble divalent tin salts of the present invention is one comprised predominantly of polyethyleneimine and which is the subject of my copending application, identified above.

The polymeric film or coating of polyethyleneimine is applied to the interior surfaces of the polymerization reactor wherein suspension polymerization reactions are carried out. Likewise, all exposed surfaces on the interior of the reactor, such as the baffles, agitator, and the like, are also coated in like manner. The coating thus applied is readily cured or insolubilized by the use of heat or a curing or cross-linking agent, as hereinafter more fully described. The polymeric coating of polyethyleneimine is hydrophilic in nature, and, accordingly, is wet by water, or absorbs water, without peeling off or blistering. The polymeric coating retains its hydrophilicity even though insolubilized. The hydrophilic polymer coating thus provides a water layer, so to speak, on the interior surfaces and repels the monomer or monomers being polymerized.

The polyethyleneimine polymer coating solution is made by conventional methods, using heat and agitation where necessary. The polymer is dissolved in water to give a solution that has a viscosity such that it can be sprayed or brushed on the reactor surfaces, such as in the case of paint. Usually a coating solution having a solids content in the range of about 5 to about 20% by weight is satisfactory. In addition to curing agents, additives may be employed in the coating, if desired, such as plasticizers, dyes, fillers or pigments, and the like.

After application of the coating to the surfaces to be protected, the coating, or polymer, is cured or set in order to insolubilize the same. The polymer may be cured by heating by any suitable means, such as by the use of heaters positioned internally of the reactor, or radiant heating, by pumping heated air or other gas through the reactor, and the like. When heat curing, usually a temperature in the range of 100°C. to 140°C. is sufficient. However, a more preferred method of curing or insolubilizing the polymeric coating is by incorporation into the polymeric coating of a curing or cross-linking agent. Such agent may be mixed into the coating solution prior to application or it may be applied after the polymeric coating is applied as a second or top coating. In either case, upon the application of heat, cross-linking or curing of the polyethyleneimine occurs. The heat required in this operation is not as great as that necessary in the absence of a curing agent. Usually a temperature in the range of about 70°C. to about 120°C. is satisfactory. Among the various curing agents that may be employed in the practice of the present invention there may be named ethylene dichloride, urea, formaldehyde, and other aldehydes such as glyoxal, acetaldehyde, paraformaldehyde, and the like; acid anhydrides, such as acetic anhydride, phthalic anhydride, maleic anhydride, and the like; diisocyanates, such as methylene diisocyanate, tolylene diisocyanate, and so forth. Particularly useful, from a practical and economic point of view, is formaldehyde.

While the coating is prepared as an aqueous solution, after application and curing the coating becomes insoluble in water or is insolubilized. This is necessary since the coating must not only be insoluble in the reaction mixture, but also it is necessary that the coating should remain substantially chemically unaffected in the presence of the components of the reaction, that is, it should be substantially inert under the reaction conditions.

As previously pointed out, the coating may be applied to the interior surfaces of the reaction vessel in any convenient manner, such as spraying, brushing on, and the like. Brushing has been found to be efficient since it insures complete coverage of all surfaces. Any uncovered areas, such as pinholes, etc., should be avoided since such exposed areas provide sites for polymer build-up. If desired, more than one application or layer of the coating may be used. In many instances, depending upon the condition of the surface being coated, plural layers are desirable since complete coverage is thereby insured. In this regard, it should be noted that for best results the surface being coated should be as clean and smooth as possible. In the case of metal surfaces, cleaning by acid etching or abrading is satisfactory.

The amount of coating applied, or the thickness thereof, is not particularly critical. However, for economic reasons, as thin a coating as possible should be applied to the surfaces to be protected but still insuring complete coverage. Again, it should be borne in mind that in addition to coating the interior surfaces or walls of the reaction vessel, all other parts therein should likewise be coated, such as baffles, agitator shaft and blades, heating coils, temperature probes, and the like. Suffice it to say that a sufficient amount of coating should be employed to obtain a continuous film over all interior surfaces of the reaction vessel with no areas of said surfaces remaining unprotected.

The polymerization process of the instant invention is of the dispersion or suspension type, preferably in an aqueous medium, although the invention is likewise applicable to solution polymerization. The water phase polymerization inhibitor employed is preferably one that is highly soluble in water and more importantly, highly insoluble in the monomer or monomers being polymerized. While any inhibitor meeting such solubility requirements and which is a peroxide destroyer may be employed, such as phenols, aromatic amine salts, aromatic nitro compounds, sulfites, etc. I have found that the divalent tin salts produce the desired results with the polyethyleneimine coating. In other words, not any known polymerization inhibitor will produce the superior results with the coating herein described.

The water-soluble divalent tin salts useful in the present invention are the inorganic acid tin salts, such as stannous chloride, stannous fluoride, stannous bromide, stannous sulfate, stannous nitrate, and the like. Of course, it is necessary to employ an amount of inhibitor which will prevent polymerization of the monomer or monomers in the aqueous phase during the reaction. Usually an amount of about 0.004 part to about 0.040 part by weight, based on 100 parts by weight of the monomer or monomers being polymerized, is sufficient. Preferably, an amount of inhibitor in the range of about 0.01 part to about 0.03 part by weight is employed.

The inhibitor can be added to the aqueous phase as the polymerization vessel is being charged with the various reaction ingredients or it may be dissolved in the water prior to charging the vessel. In any event the inhibitor should be present in the aqueous medium prior to contact or mixing with the monomer or monomers to be polymerized.

The polymerization reaction to be carried out in the coated equipment may be commenced immediately after the coating is cured with no particular modification of processing techniques being required due to the presence of the coating. Further, utilization of the polyethyleneimine coated reaction vessel does not adversely affect the heat stability or other physical and chemical properties of the polymers produced while the polymerization medium is in contact therewith. Ordinary care should, of course, be exercised to avoid rough, physical contact with the coated surfaces because of the damage to the coating which may result from such contacts.

While the present invention is specifically illustrated hereinafter with regard to the suspension polymerization of vinyl chloride, it is to be understood that the apparatus and process may likewise be applied in the dispersion or suspension polymerization of any polymerizable ethylenically unsaturated monomer or monomers where undesirable polymer build-up occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example, methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene;

diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinyl or vinylidene monomers copolymerizable therewith in amounts as great as about 80 percent or more by weight, based on the weight of the monomer mixture, since polymer build-up in the reaction vessel is a particularly bad problem here.

The polymerization process of the present invention is usually conducted at a temperature in the range of about 0°C. to about 100°C. depending upon the particular monomer or monomers being polymerized. However, it is preferred to employ temperatures in the range of about 40°C. to about 70°C., since, at these temperatures polymers having the most beneficial properties are produced. The time of the polymerization reaction will normally vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

The following specific example sets forth more clearly the present invention. It is to be understood, however, that this is merely intended in an illustrative and not a limitative sense. In the example, all parts and percents are by weight unless otherwise indicated.

EXAMPLE I

In this example, the reactor was coated with the following composition:

700 gms. (24.8%) polyethyleneimine (50% aqueous solution of polyethyleneimine from Dow Chemical Company)
2100 gms. (74.5%) water (demineralized)
19.6 gms. (0.69%) formaldehyde (5% aqueous solution of formaldehyde)

The polyethyleneimine and formaldehyde were mixed in the water with agitation for 15 minutes at room temperature. The coating solution thus formed was then wiped on the internal surfaces of the polymerization reactor and steam run into the jacket of the reactor to dry and cure the coating. The temperature in the jacket was 100°C. and maintained for approximately 1 hour to insure complete cure or insolubilization.

In the polymerization reaction the following recipe was used:

|  | Parts | Grams |
| --- | --- | --- |
| Vinyl Chloride | 100 | 900 |
| Water (demineralized) | 180 | 1620 |
| Polyvinyl alcohol | 0.15 | 1.35 |
| Di(secondary butyl) peroxy dicarbonate | 0.05 | 0.45 |
| Stannous chloride dihydrate | 0.018 | 0.162 |

The water, polyvinyl alcohol and stannous chloride were well mixed and added to the reactor. The vinyl chloride was added next and then the catalyst di(-secondary butyl)peroxy dicarbonate and upon commencement of the reaction the temperature was 56°C. and so maintained throughout the reaction period. The reaction was continued for 4 hours and 35 minutes.

After completion of the reaction, the reactor was emptied in the usual manner and the inner surfaces examined. There was no sign of build-up of polymer on any of the inner surfaces including the mixer shaft and blades and baffles which had also been coated. When the above recipe was employed under the same reaction conditions in a reactor that had not been coated as aforesaid, a thin paper build-up of polymer was noted on almost the entire inner surface of the reactor. In fact, in some areas there were pronounced streaks of polymer build-up. This example shows that the combination of polyethyleneimine coating and divalent tin salt inhibitor produces the desired result.

It can readily be seen that the process of the present invention provides a means of producing polymers economically with substantially no build-up of polymer on the internal surfaces of the reaction vessel being employed. This results in increased production over a unit period of time. In those few instances where a little polymer does accumulate on the interior surfaces, it is not of the difficult to remove hard rough type and is easily removed by rinsing without employing the difficult tedious scraping methods that are presently necessary in the art. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. In a process for the polymerization of monomers selected from vinyl halides, vinylidene halides, vinylidene monomers having at least one terminal $CH_2=C<$ grouping, and mixtures thereof which comprises polymerizing the monomer or monomers in an aqueous polymerization medium which contains a water-soluble divalent tin salt of an inorganic acid as a water-phase polymerization inhibitor and keeping said polymerization medium in constant contact with a surface coated with a composition comprised predominantly of an insolubilized polyethyleneimine polymer throughout the polymerization reaction, whereby due to the synergistic effect of said polyethyleneimine and said inhibitor, polymer build-up on said surface is substantially eliminated.

2. A process as defined in claim 1 wherein the monomer is vinyl chloride.

3. A process as defined in claim 1 wherein the polymerization reaction is conducted at a temperature in the range of 0°C. to 100°C.

4. A process as defined in claim 1 wherein the composition contains formaldehyde as an insolubilizing agent.

5. A process as defined in claim 1 wherein said water-phase polymerization inhibitor is stannous chloride.

6. A process as defined in claim 5 wherein the monomer is vinyl chloride.

7. A process as defined in claim 6 wherein the polymerization reaction is conducted at a temperature in the range of 0°C. to 100°C.

8. A process as defined in claim 7 wherein the composition contains formaldehyde as an insolubilizing agent.

\* \* \* \* \*